United States Patent
Lu

(10) Patent No.: US 8,098,874 B2
(45) Date of Patent: Jan. 17, 2012

(54) HANGING TYPE EARPHONE WITH A HINGE UNIT

(75) Inventor: Wen-Ren Lu, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 1217 days.

(21) Appl. No.: 11/826,548

(22) Filed: Jul. 17, 2007

(65) Prior Publication Data

US 2009/0019666 A1    Jan. 22, 2009

(51) Int. Cl.
*H04R 25/00* (2006.01)
(52) U.S. Cl. ...................................... 381/381
(58) Field of Classification Search ............. 381/381, 381/370, 374; 16/330
See application file for complete search history.

(56) References Cited

U.S. PATENT DOCUMENTS

| | | | | |
|---|---|---|---|---|
| 6,115,886 A * | 9/2000 | Fujita | ............................... | 16/330 |
| 6,772,481 B2 * | 8/2004 | Oshima et al. | .................. | 16/330 |
| 7,778,410 B2 * | 8/2010 | Liu et al. | ........................ | 379/430 |
| 2009/0019666 A1 * | 1/2009 | Lu | .................................. | 16/221 |

* cited by examiner

*Primary Examiner* — Jeffrey Donels
(74) *Attorney, Agent, or Firm* — Cheng-Ju Chiang

(57) ABSTRACT

A hanging type earphone with a hinge unit includes an earphone body, a hang member and a hinge unit. The earphone body has a connecting base defining a receiving space. The hinge unit received in the receiving space includes a positioning base, an axis cover and a pivotal axis having a mating portion whose cross-section is a polygon. The axis cover presses against the positioning base to form a pivotal space, one end of the pivotal axis is fixed in the hang member and the other end passes through the pivotal space, the mating portion mates with the side walls of the axis cover, thereby, the earphone body is positioned after rotating relatively to the hang member. Moreover, the pivot axis can be pulled out from the pivotal hole and then inserted into the pivotal space from the opposite direction, so the hanging type earphone can be hung on either ear of the user.

5 Claims, 8 Drawing Sheets

HANGING TYPE EARPHONE WITH A HINGE UNIT

BACKGROUND OF THE INVENTION

1. Field of the Invention

The present invention relates to a hanging type earphone, and more particularly to a hanging type earphone with a hinge unit.

2. The Related Art

Personal audio devices, commonly known as headphones, earphones, hanging type earphones and the like, are developed and popularly used all around the world. Most of hanging type earphones include an approximate C-shaped hang member and an earphone body. The hang member matches with the user's ear and is hung on the ear. In one kind of conventional hanging type earphones, the hang member is positioned in the earphone body, as a result, the hang member is not able to move and rotate about the earphone body. In use, it's inconvenient and discomfort for user to wear or take off the hanging type earphone, so a hanging type earphone having a hang member and an earphone body with a relative movement therebetween is developed.

A conventional hanging type earphone with a hinge unit includes a hang member and an earphone body, the hang member is rotatable in the earphone body through the hinge unit. The side surface of the earphone body defines a plurality of sliding holes. An axis is located at one end of the hang member and is inserted into one of the sliding holes, the axis is rotatable in the sliding hole and is able to move from one sliding hole to another for adjusting the relative position between the hang member and the earphone body. However, though the axis of the hang member is rotatable in the earphone body, the hang member can't position in the earphone body after the rotation, so this convetional hanging type earphone can't position on the user's ear.

SUMMARY OF THE INVENTION

Accordingly, an object of the present invention is to provide a hanging type earphone with a hinge unit including an earphone body, a hang member and a hinge unit. The earphone body has a housing with a connecting base, the connecting base has two opposite pivotal portions apart from each other, a receiving space is formed between the two pivotal portions, each pivotal portion has a pivotal hole, the corresponding place of the bottom surface of the housing forms an opening for exposing the pivotal portions and the receiving space. The hinge unit includes a positioning base, a pivotal axis placed in the opening of the earphone body, an axis cover having two side walls and a top wall and placed on the positioning base to form a pivotal space therebetween. The upper portion of the axis cover is received in the receiving space and corresponds with the pivotal holes. The pivotal axis has a fixing portion connecting to one end of the hang member and a mating portion whose cross-section being an approximate even regular polygon. The mating portion includes mating surfaces and smooth connecting surfaces for connecting the two adjacent mating surfaces, a first supporting portion is defined at one end of the mating portion, a second supporting portion extends from the other end of the mating portion. The mating portion is rotatably received in the pivotal space and presses against the side walls of the axis cover, the first and second supporting portions are rotatably received in the two pivotal holes of the earphone body respectively.

Another object of the present invention is to provide a hanging type earphone with a hinge unit including an earphone body, a hang member and a hinge unit. The earphone body has a housing with a connecting base, the connecting base has two opposite pivotal portions apart from each other, a receiving space is formed between the two pivotal portions, each pivotal portion has a pivotal hole, the corresponding place of the bottom surface of the housing forms an opening for exposing the pivotal portions and the receiving space. The hinge unit includes a positioning base, a pivotal axis placed in the opening of the earphone body, an axis cover having two side walls and a top wall and placed on the positioning base to form a pivotal space therebetween. The upper portion of the axis cover is received in the receiving space and corresponds with the pivotal holes. The pivotal axis has a fixing portion connecting to one end of the hang member and a mating portion whose cross-section being an approximate regular polygon. The mating portion includes mating surfaces and smooth connecting surfaces for connecting the two adjacent mating surfaces, a first supporting portion is defined at one end of the mating portion, a second supporting portion extends from the other end of the mating portion. The mating portion is rotatably received in the pivotal space and presses against the side walls of the axis cover, the first and second supporting portions are rotatably received in the two pivotal holes of the earphone body respectively.

the mating surfaces or the connecting surfaces of the mating portion of the pivot axis press against the inner surface of the side wall of the axis cover fast, thereby, the earphone body is positioned after rotating relatively to the hang member. Moreover, the pivot axis and the hang member can be pulled out together from one end of the pivotal hole and then inserted into the pivotal space from the other end of the pivotal hole, so the hanging type earphone of the present invention can be hung on either ear of the user.

BRIEF DESCRIPTION OF THE DRAWINGS

The present invention will be apparent to those skilled in the art by reading the following description of a preferred embodiment thereof, with reference to the attached drawings, in which.

DETAILED DESCRIPTION OF THE PREFERRED EMBODIMENT

Figure 1:
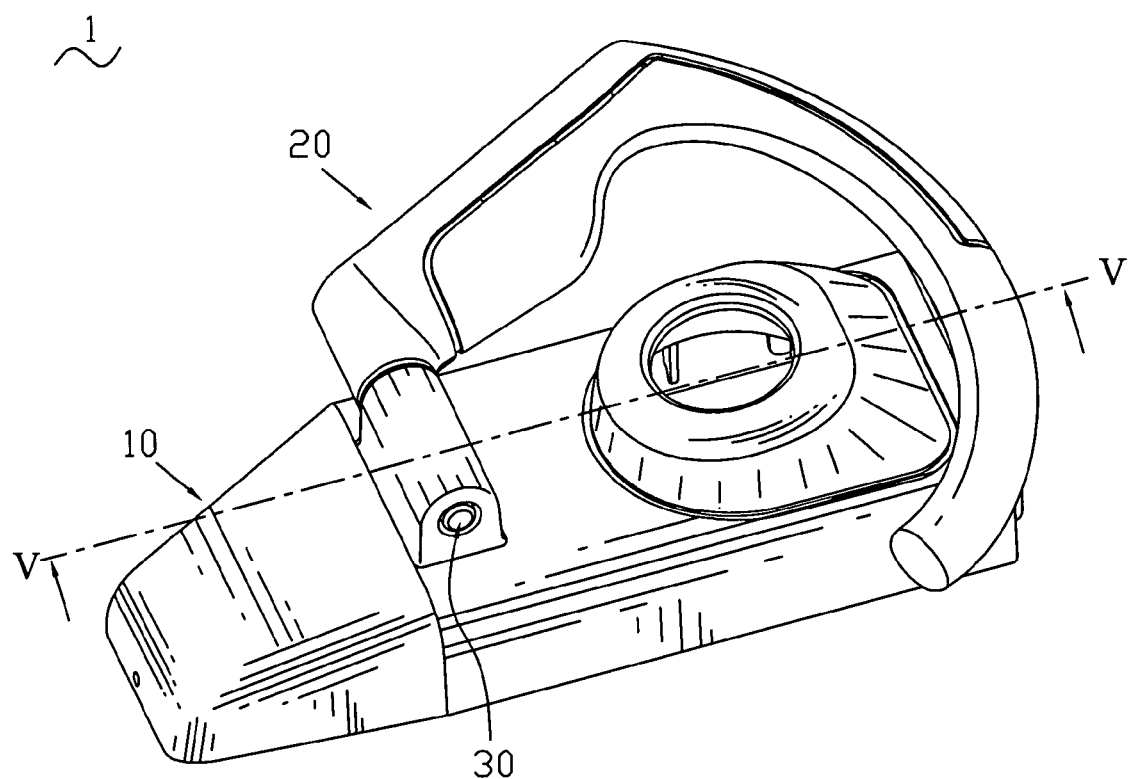
FIG. 1 is a perspective view of a hanging type earphone with a hinge unit of the present invention.

Please refer to FIG. 1, a hanging type earphone with a hinge unit 1 includes an earphone body 10, a hang member 20 and a hinge unit 30.

Figure 2:
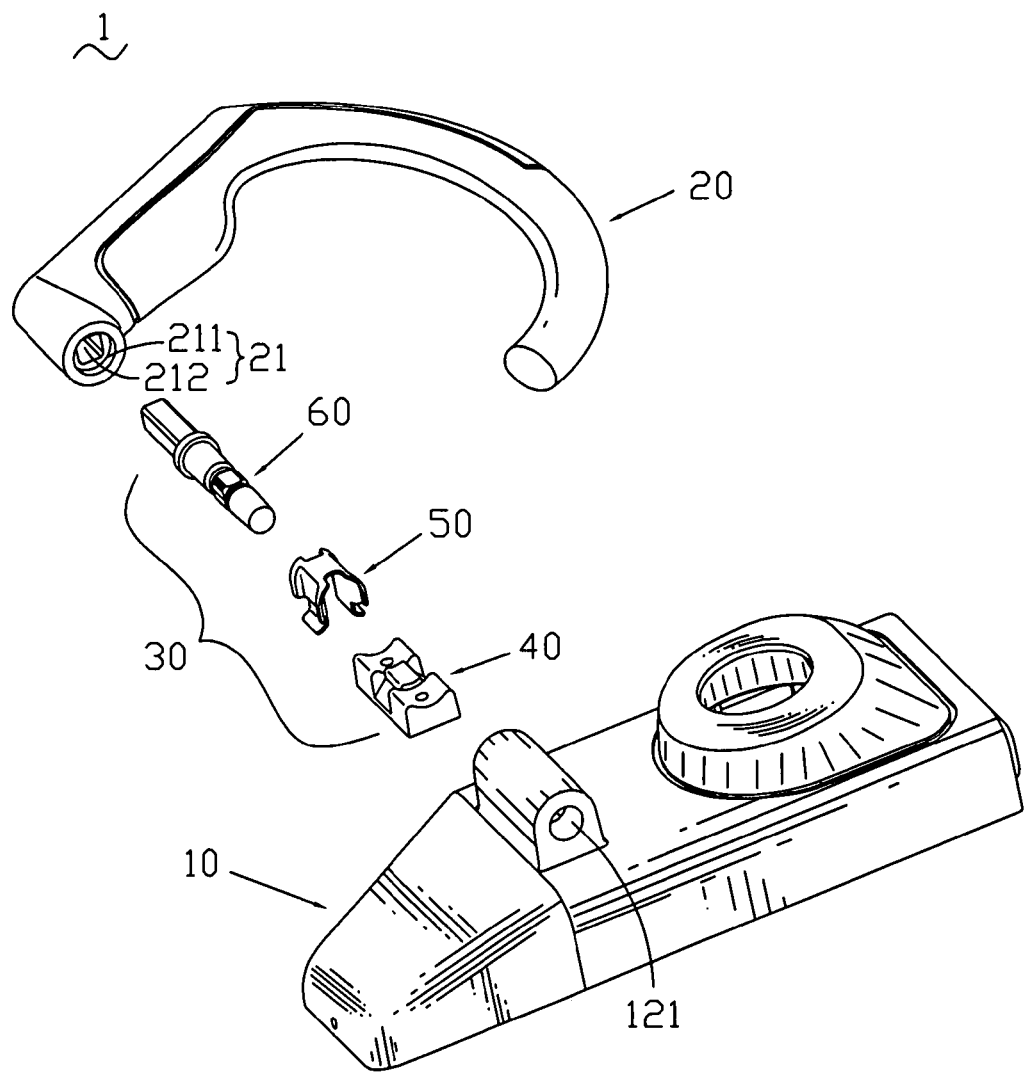
FIG. 2 is an exploded view of the hanging type earphone with a hinge unit shown in FIG. 1.

Then referring to FIG. 2, one end of the hang member 20 defines a fixing hole 21. The fixing hole 21 has a first fixing hole 211 and a second fixing hole 212 defined at the middle of the bottom of the first fixing hole 211.

Figure 3:
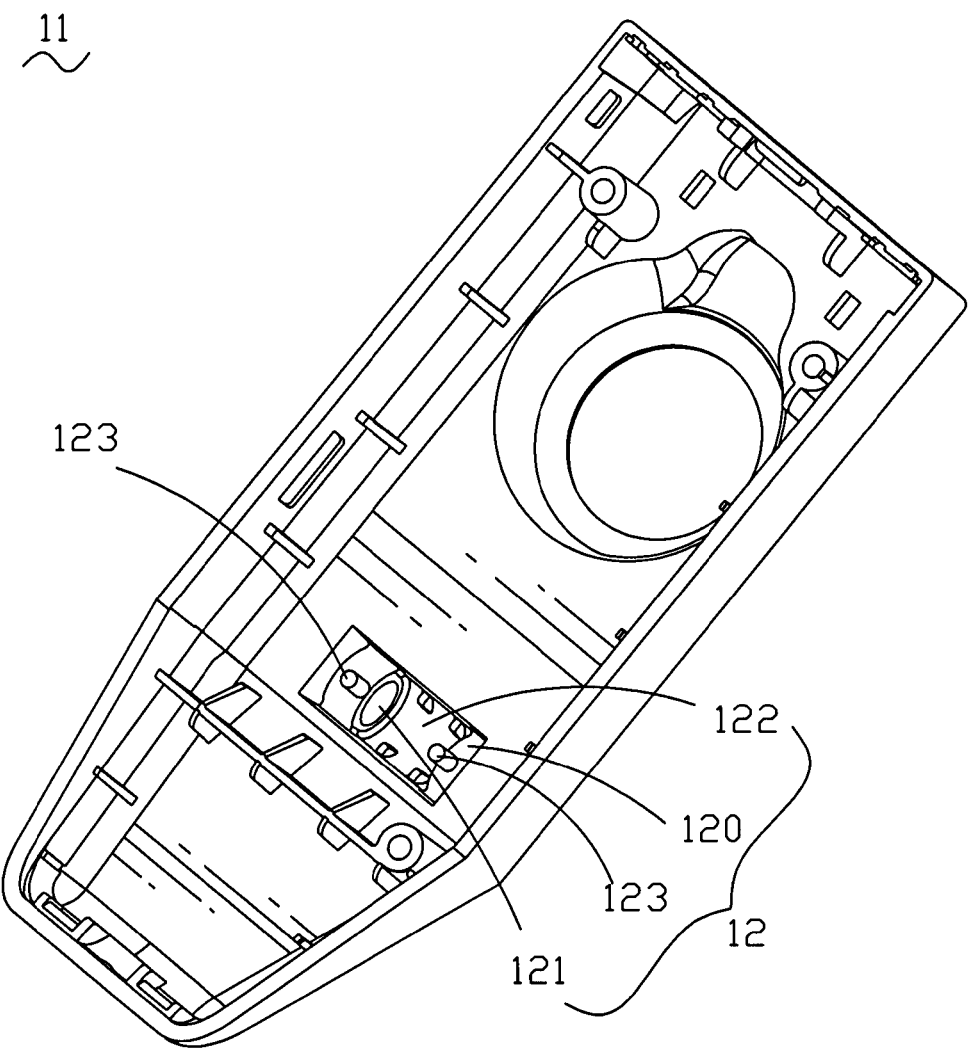
FIG. 3 is a perspective view of a housing of an earphone body of the earphone with a hinge unit.

Please refer to FIG. 3, a housing 11 of the earphone body 10 has a connecting base 12, the connecting base 12 has two opposite pivotal portions 120 apart from each other, a receiving space 122 is formed between the two pivotal portions 120. Each pivotal portion 120 has a pivotal hole 121. The bottom of each pivotal portion 120 protrudes to form a pin 123. The corresponding place of the bottom surface of the housing 11 is cut to form an opening for exposing the pivotal portions 120, the receiving space 122 and the pins 123.

Figure 4:
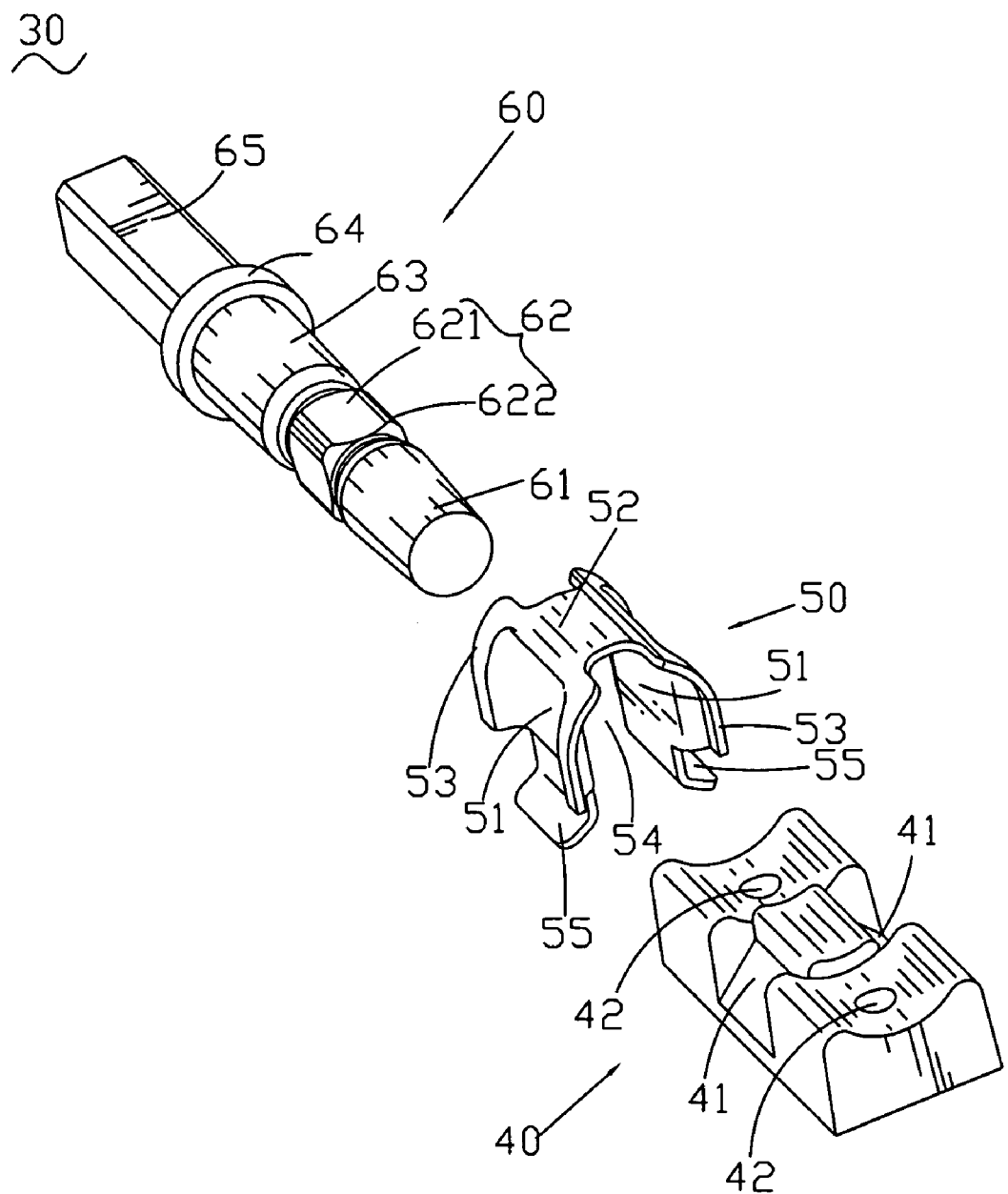
FIG. 4 is a perspective view of a hinge unit of the present invention.
Figure 5:
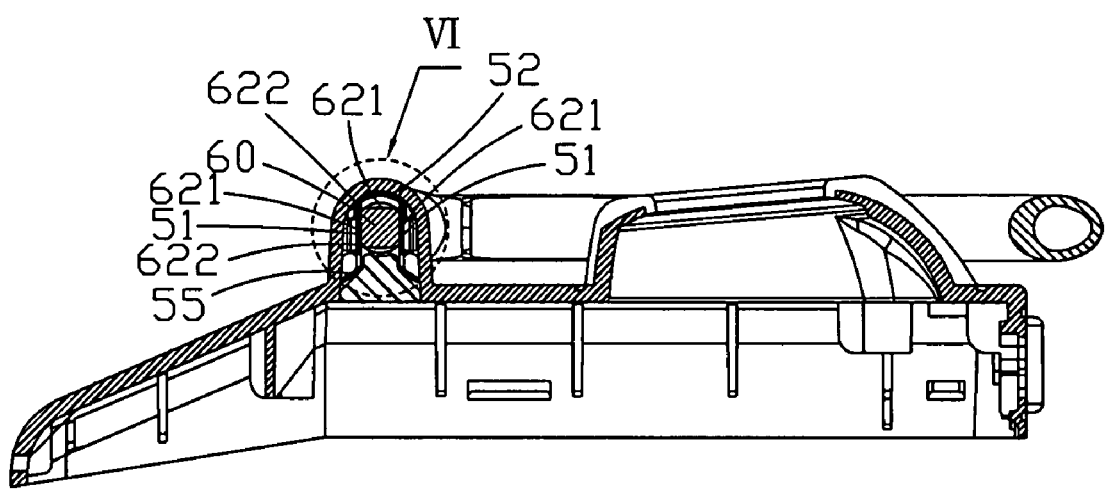
FIG. 5 is a cross-sectional view taken along line V-V shown in FIG.1.
Figure 6:
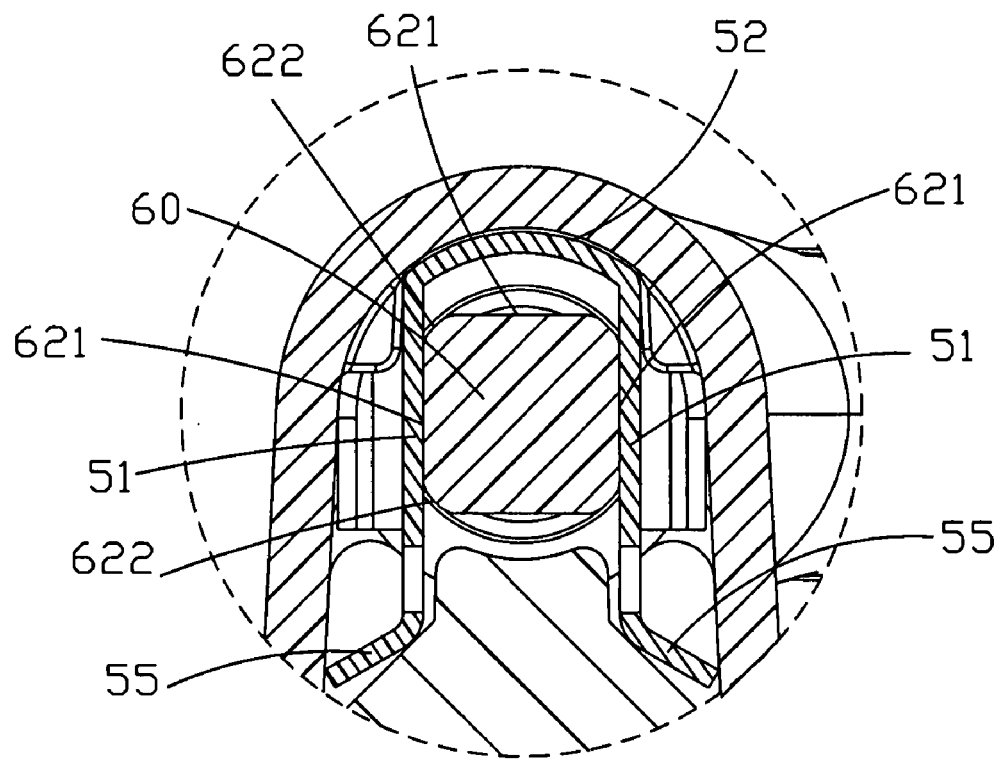
FIG. 6 is a partial enlarged view of an encircled portion labeled VI shown in FIG. 5.
Figure 7:
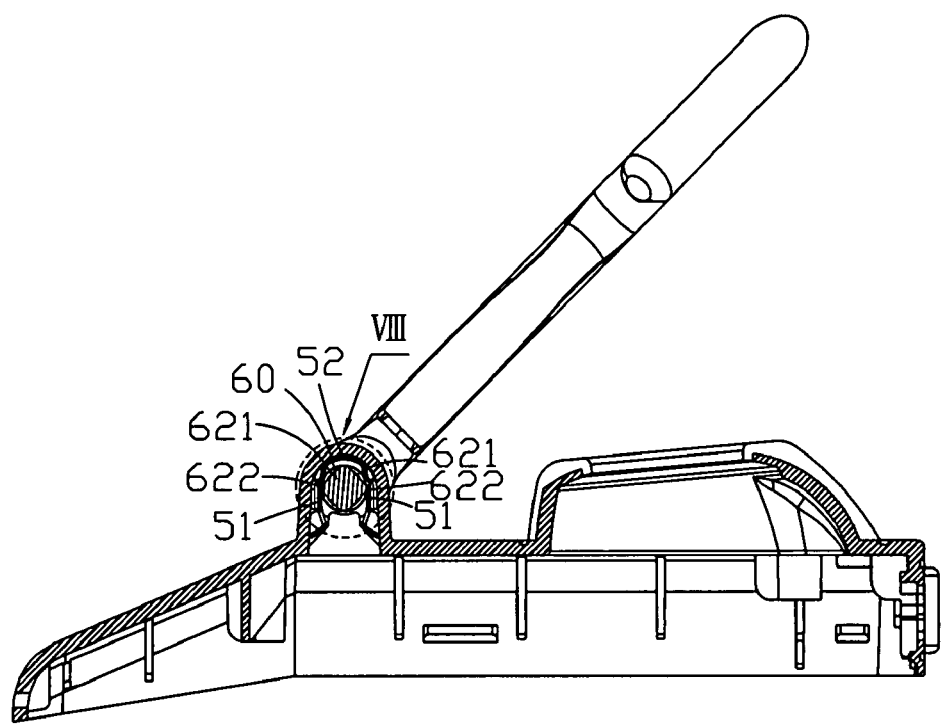
FIG. 7 is a cross-sectional view taken along line V-V of FIG. 1 with a hang member rotating a certain angle to the earphone body.
Figure 8:
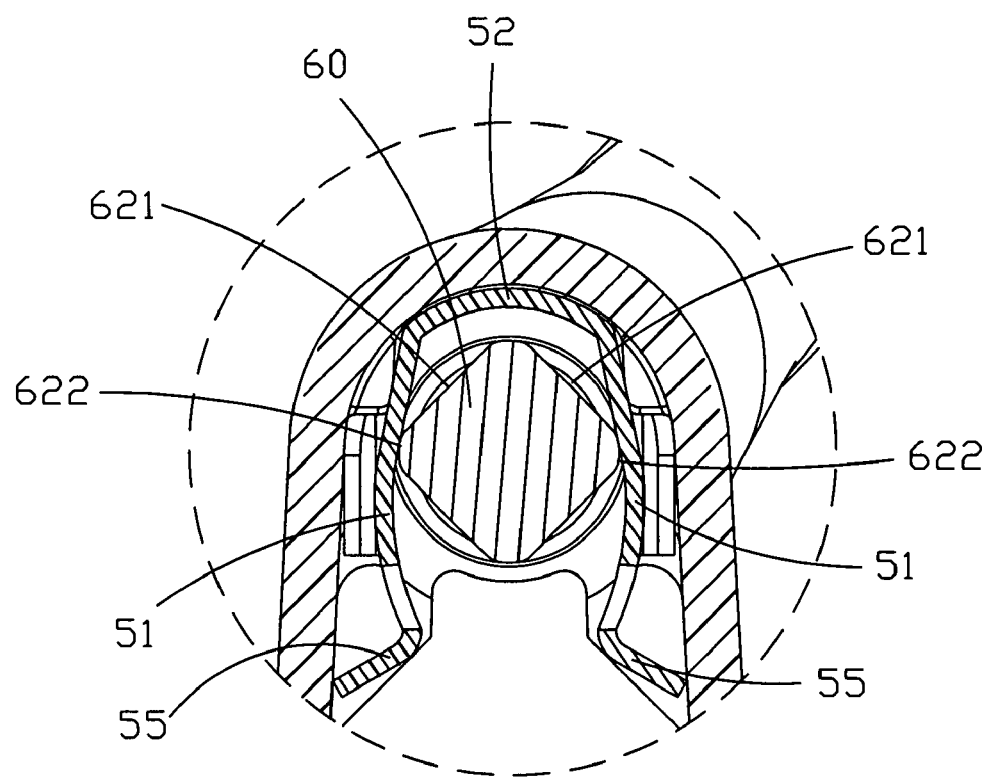
FIG. 8 is a partial enlarged view of an encircled portion labeled VIII of FIG. 7.

Please refer to FIG. 4, the hinge unit 30 includes a positioning base 40, a metallic axis cover 50 and a pivotal axis 60. Two opposite ends of the top surface of the positioning base 40 define a wedge-shaped recess 41 respectively, the recess 41 inclines sideward and communicates with the side surface of the positioning base 40. The other two opposite ends of the top surface of the positioning base 40 define an accepting hole 42 respectively. The axis cover 50 is arcuate and has two side walls 51 and a top wall 52. Both of two ends of the side wall 51 extend outward to form a guide wall 53 respectively for guiding the insertion of the pivotal axis 60. The bottom of the side wall 51 extends downward and then inclines outward to form a positioning wing 55. The positioning wing 55 presses against the bottom of the wedge-shaped recess 41 of the positioning base 40. The pivotal axis 60 has a mating portion 62 whose cross-section is an approximate square, the mating portion 62 includes four mating surfaces 621 and four smooth connecting surfaces 622 for connecting the two mating surfaces next to each other. A first supporting portion 61 is defined at one end of the mating portion 62, a second supporting portion 63 extends from the other end of the mating portion 62. A blocking portion 64 is defined between the second supporting portion 63 and the fixing portion 65.

Please refer to FIGS. 1-4, when the hang member 20 and the hinge unit 30 is assembled with the earphone body 10, the positioning wing 55 of the axis cover 50 presses against the bottom of the wedge-shaped recess 41 of the positioning base 40 to form a pivotal space 54, then the axis cover 50 together with the positioning base 40 is placed in the opening of the housing, the upper portion of the axis cover 50 is received in the receiving space 122 and corresponds with the pivotal holes 121, meanwhile, the pin 123 is inserted into the accepting hole 42 for fixing the axis cover 50 and the positioning base 40 in the earphone body 10. The fixing portion 65 is received in the second fixing hole 212 of the hang member 20. The blocking portion 64 is received in the first fixing hole 211, in this way, the pivotal axis 60 and the hang member 20 are fixed together, then the first supporting portion 61 of the pivotal axis 60 passes through the pivotal space 54 and is rotatably received in one of the pivotal holes 121, the mating portion 62 of the pivotal axis 60 mates with the inner surface of each side wall 51 of the axis cover 50, the second supporting portion 63 is rotatably received in the other pivotal hole 121, then the hanging type earphone 1 is assembled.

Referring to FIGS. 5-8, FIG. 5 shows a status that the pivotal axis 60 doesn't rotate in the earphone body 10. In this status, the mating surface 621 of the mating portion 62 mates with the inner surface of each side wall 51, so the pivotal axis 60 is clipped tightly by the side walls 51 and doesn't rotate in the pivotal space 54 (shown in FIG. 6). Then turn to FIG. 7, when the hang member 20 and the pivotal axis 60 rotate together under an outer force, firstly, after rotating 45 degrees, the connecting surface 622 presses against the inner surface of the side wall 51 and the middle part of the side wall 51 is curved outward, so the mating portion 62 is clipped more tightly by the side wall 51 and doesn't rotate in the pivotal space 54, then rotate the hang member 20 and the pivotal axis 60 with a second 45 degrees again, the mating surface 621 mates with the inner surface of side wall 51 of the axis cover 50, the following steps are the same as the steps described hereinbefore. In a word, the earphone body 10 is positioned after rotating relatively to the hang member 20 when the mating surfaces 621 or the connecting surfaces 622 of the mating portion 62 press against the inner surfaces of the side walls 51.

Figure 9:
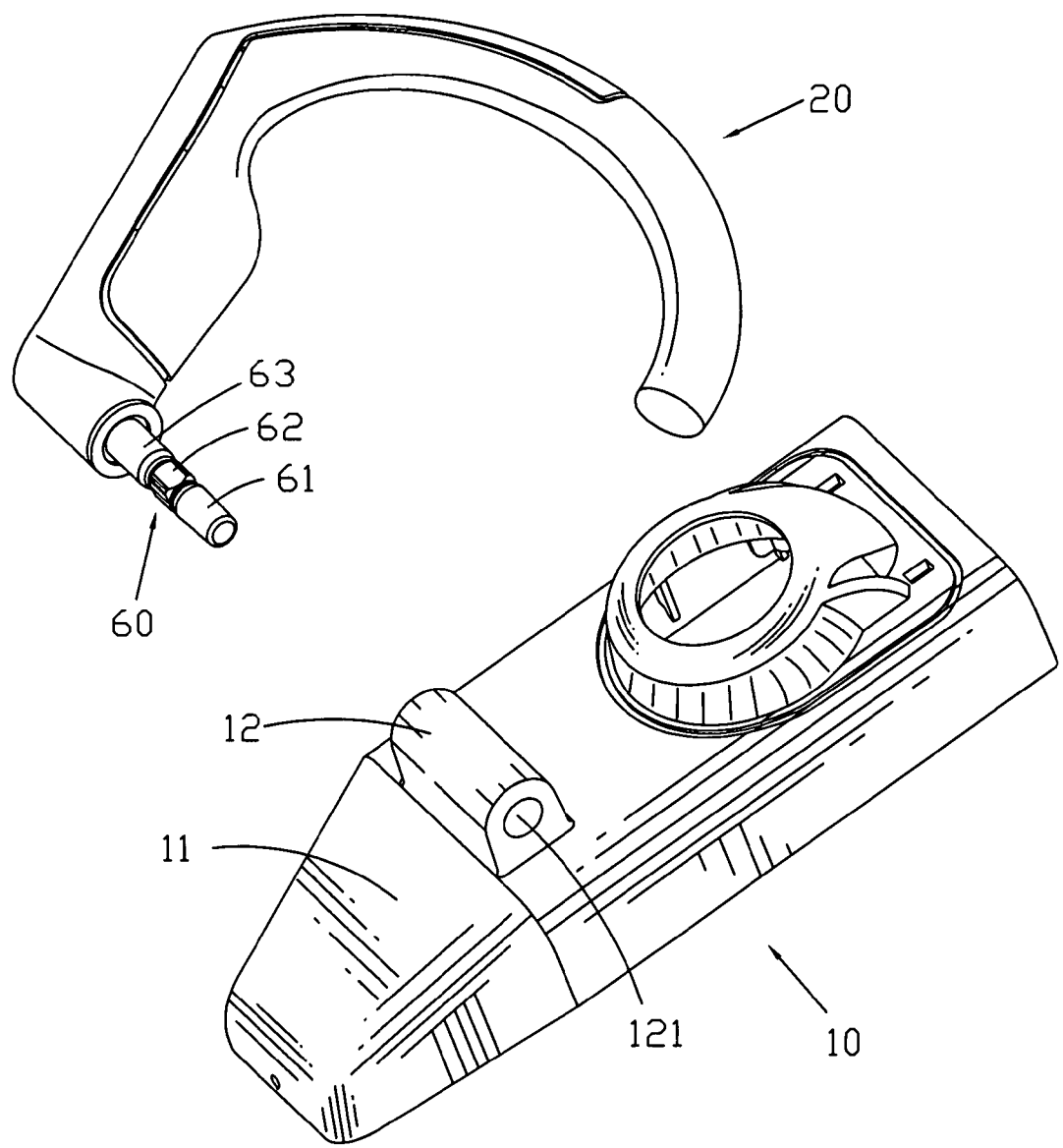
FIG. 9 is a perspective assembling view showing the hang member together with an pivotal axis being to be inserted into the earphone body from one side.
Figure 10:
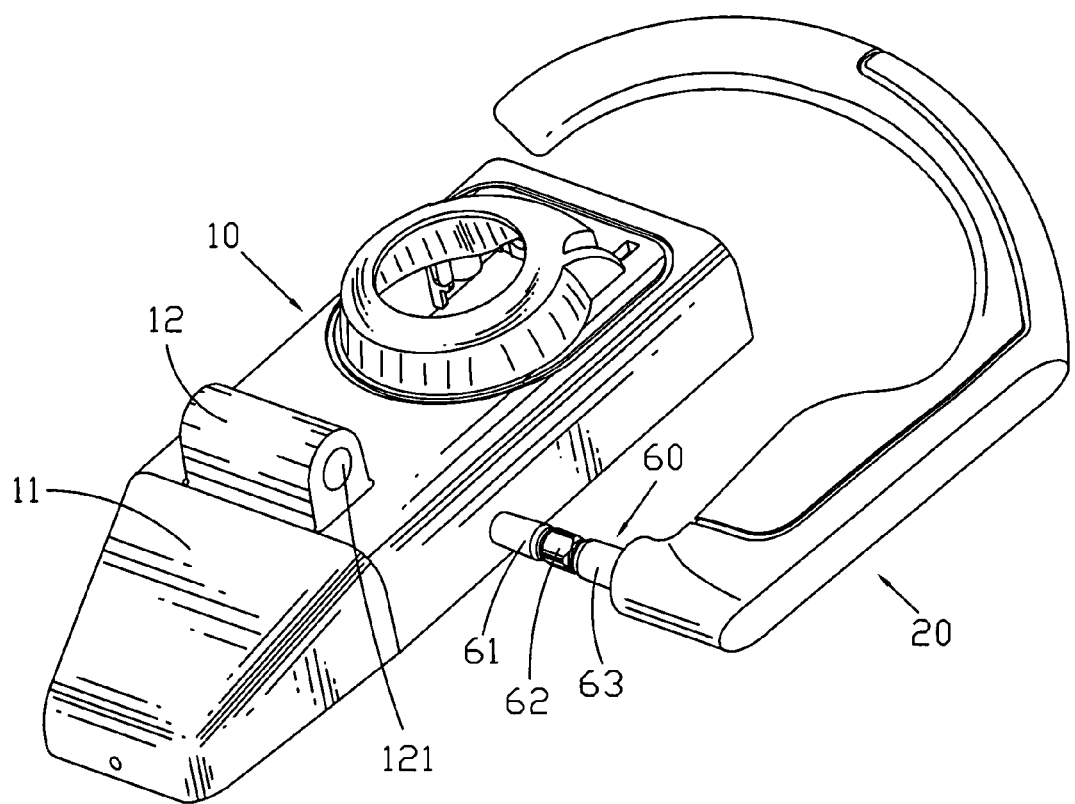
FIG. 10 is a perspective assembling view showing the hang member together with the pivotal axis being to be inserted into the earphone body from the other side.

Please refer to FIGS. 9-10, when the user needs to hang the earphone 1 on the other ear, the pivot axis 60 is pulled out from the pivotal holes 121 and the pivotal space 54, and then is inserted into the pivotal holes 121 and the pivotal space 54 in the opposite direction of the connecting base 12, the first supporting portion 61 is easy to pass through the pivotal space 54 and be rotatably received in one of the pivotal hole 121 because of the guiding of the guide walls 53, the mating portion 62 is clipped between the inner surfaces of the side walls 61, the second supporting portion 63 is rotatably received in the other pivotal hole 121. The earphone body 10 is positioned after rotating relatively to the hang member 20 when the mating surfaces 621 or the connecting surfaces 622 of the mating portion 62 presses against the inner surfaces of the side walls 51, the principle of the action is the same as the principle of the earphone 1 used on the other ear described above. It's obviously that the hanging type earphone 1 of the present invention can be hung on either ear of the user.

As described above, the mating surfaces 621 or the connecting surfaces 622 of the mating portion 62 press against the inner surfaces of the side walls 51 of the axis cover 50, thereby, the earphone body 10 is positioned after rotating relatively to the hang member 20. Moreover, the pivot axis 60 can be pulled out and then inserted into in the opposite direction of the connecting base 12, so the hanging type earphone 1 of the present invention can be hung on either ear of the user.

The above embodiment is merely a specific embodiment for clarifying the technical contents of the present invention and the present invention is not to be construed in a restricted sense as limited to this specific embodiment. For example, the cross-section of the mating portion 62 of the pivot axis 60 also may be an approximate even regular polygon, moreover maybe an approximate odd regular polygon. The shape of the axis cover 50 has other varieties as long as the axis cover 50 can combine with the positioning base 40 safely to form a pivotal space 54 where the mating portion 60 can rotate steadily and tightly. Thus, the spirit and scope of the present invention are limited only by the appended claims.

What is claimed is:

1. A hanging type earphone with a hinge unit, comprising:
an earphone body having a housing with a connecting base, the connecting base having two opposite pivotal portions apart from each other, a receiving space being formed between the two pivotal portions, each pivotal portion having a pivotal hole, a corresponding place of the bottom surface of the housing forming an opening for exposing the pivotal portions and the receiving space;
a hang member; and
a hinge unit including:
a positioning base placed in the opening of the earphone body, an axis cover having two side walls and a top wall and placed on the positioning base to form a pivotal space therebetween, an upper portion of the axis cover being received in the receiving space and corresponding with the pivotal holes; and a pivotal axis having a fixing portion connecting to one end of the hang member and a mating portion whose cross-section being a polygon, the mating portion including mating surfaces and smooth connecting surfaces for connecting the two adjacent mating surfaces, a first supporting portion defined at one end of the mating portion, a second supporting portion extending from the other end of the mating portion, wherein the mating portion is rotatably received in the pivotal space and presses against the side walls of the axis cover, the first and second supporting portions are rotatably received in the two pivotal holes of the earphone body respectively.

2. The hanging type earphone with a hinge unit as claimed in claim 1, wherein the two opposite ends of the top surface of the positioning base define a wedge-shaped recess respectively, the recess inclines sideward and communicates with the side surface of the positioning base, the bottom of the side wall extends downward and then inclines outward to form a positioning wing for mating with the wedge-shaped recess.

3. The hanging type earphone with a hinge unit as claimed in claim 1, wherein the side wall extends outward to form a pair of guide walls at two ends thereof for guiding the insertion of the pivotal axis.

4. The hanging type earphone with a hinge unit as claimed in claim 1, wherein the cross-section of the mating portion is a square.

5. The hanging type earphone with a hinge unit as claimed in claim 1, wherein the bottom of each pivotal portion protrudes to form a pin, correspondingly, the top surface of the positioning base defines two accepting holes, the pin is inserted into the accepting hole for fixing the axis cover and the positioning base in the earphone body.

* * * * *